United States Patent
Kamijima

(10) Patent No.: US 6,549,370 B1
(45) Date of Patent: Apr. 15, 2003

(54) THIN-FILM MAGNETIC HEAD HAVING A MAGNETIC LAYER THAT DEFINES THROAT HEIGHT AND INCLUDES A SLOPED PORTION

(75) Inventor: Akifumi Kamijima, Nihonbashi (JP)

(73) Assignee: TDK Corporation, Tokyo (JP)

( * ) Notice: Subject to any disclaimer, the term of this patent is extended or adjusted under 35 U.S.C. 154(b) by 166 days.

(21) Appl. No.: 09/714,488

(22) Filed: Nov. 17, 2000

(30) Foreign Application Priority Data

Dec. 9, 1999 (JP) .......................................... 11-350056

(51) Int. Cl.$^7$ ................................................ G11B 5/47
(52) U.S. Cl. ....................................... 360/126; 360/317
(58) Field of Search ................................. 360/317, 126

(56) References Cited

U.S. PATENT DOCUMENTS

| | | | |
|---|---|---|---|
| 5,438,747 A | 8/1995 | Krounbi et al. | |
| 6,154,346 A | 11/2000 | Sasaki | |
| 6,156,375 A | * 12/2000 | Hu | 360/126 |

FOREIGN PATENT DOCUMENTS

| | | |
|---|---|---|
| EP | 0 720 153 A2 | 7/1996 |
| JP | A-4-111211 | 4/1992 |
| JP | A 6-68424 | 3/1994 |
| JP | A 6-309621 | 11/1994 |
| JP | A 6-314413 | 11/1994 |
| JP | A 7-262519 | 10/1995 |
| JP | A-7-302410 | 11/1995 |
| JP | A-241508 | 9/1996 |
| JP | A-11-195207 | 7/1999 |

* cited by examiner

Primary Examiner—A. J. Heinz
(74) Attorney, Agent, or Firm—Oliff & Berridge PLC

(57) ABSTRACT

A recording head incorporates a bottom pole layer including a pole portion and a top pole layer including a pole portion, and a recording gap layer placed between the pole portions. The recording head further incorporates a thin-film coil placed between the bottom and top pole layers, the coil being insulated from the pole layers. The bottom pole layer includes the pole portion, a flat portion and a sloped portion. The pole portion touches the recording gap layer. The sloped portion connects the pole portion and the flat portion to each other. The distance from the sloped portion to the gap layer decreases as the distance from the air bearing surface decreases. The shapes of the pole portion and the sloped portion are defined by a convexity forming layer formed on a top shield layer of a reproducing head. The top pole layer is formed on a flat top surface of the gap layer.

6 Claims, 15 Drawing Sheets

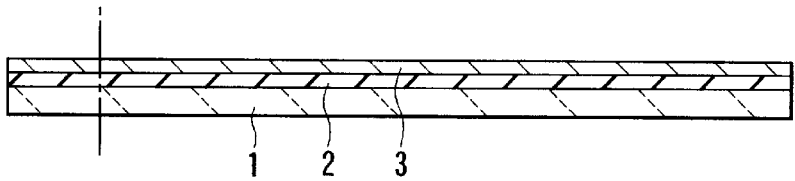
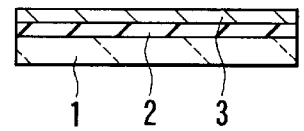
FIG. 1A  FIG. 1B
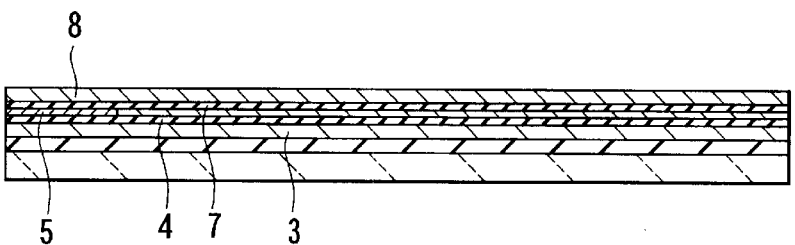
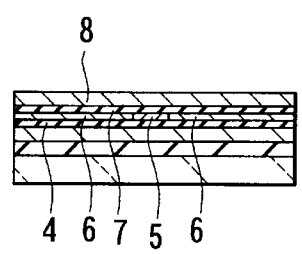
FIG. 2A  FIG. 2B
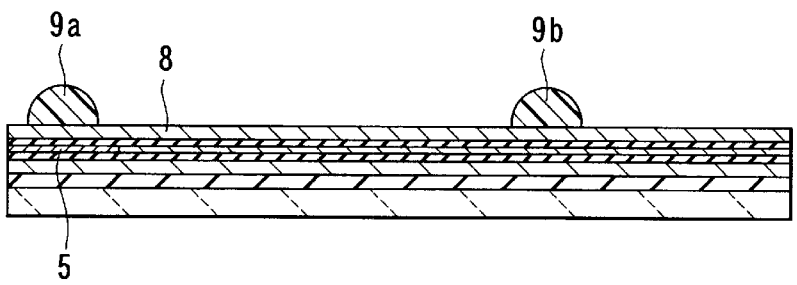
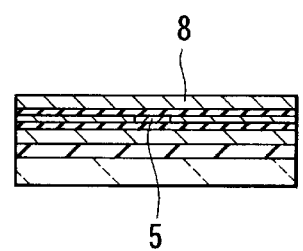
FIG. 3A  FIG. 3B

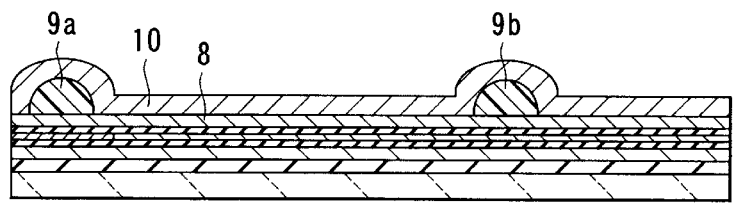 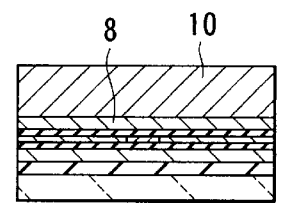
FIG. 4A  FIG. 4B
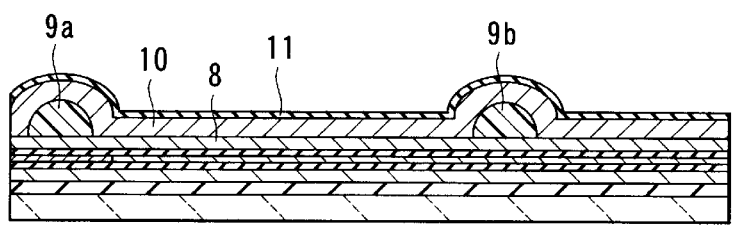 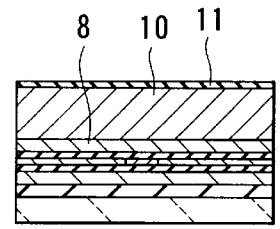
FIG. 5A  FIG. 5B

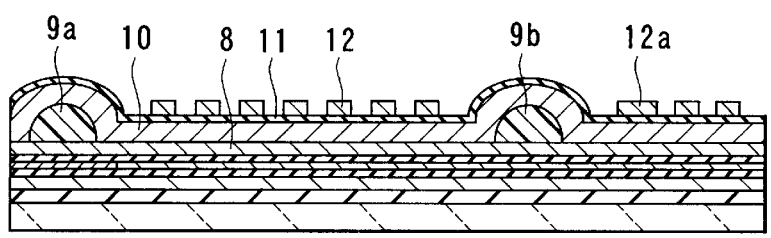 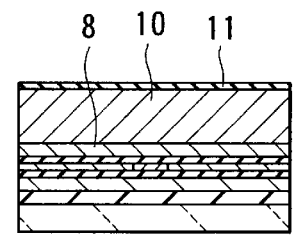
FIG. 6A FIG. 6B
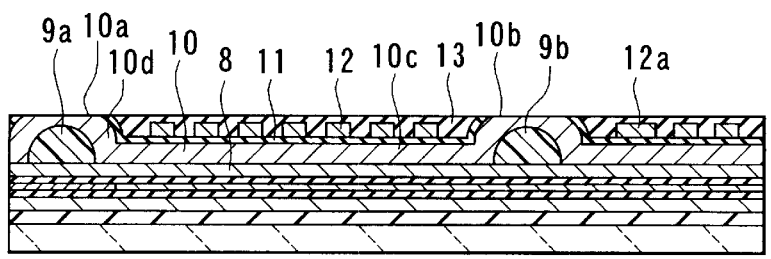 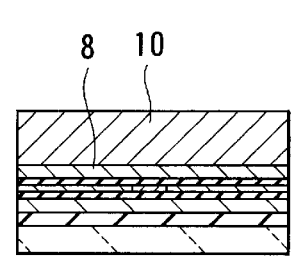
FIG. 7A FIG. 7B

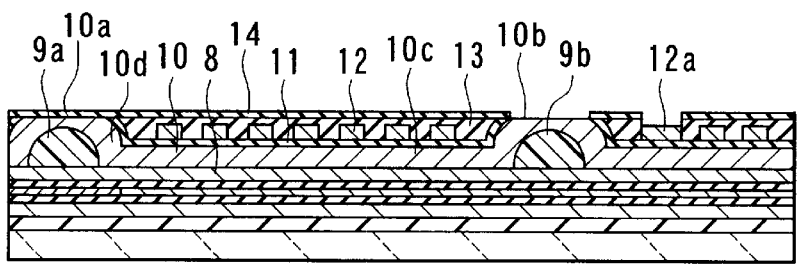 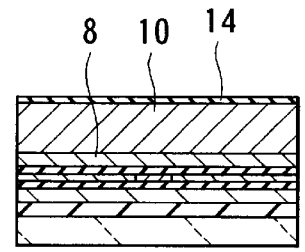
FIG. 8A            FIG. 8B
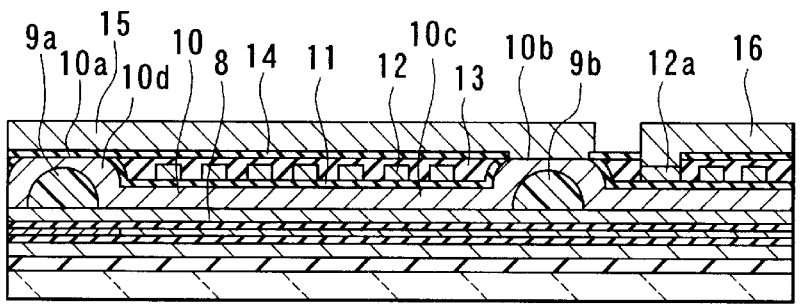 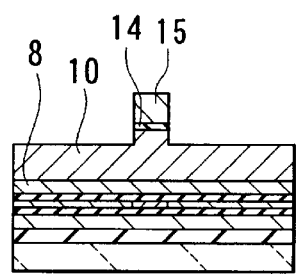
FIG. 9A            FIG. 9B

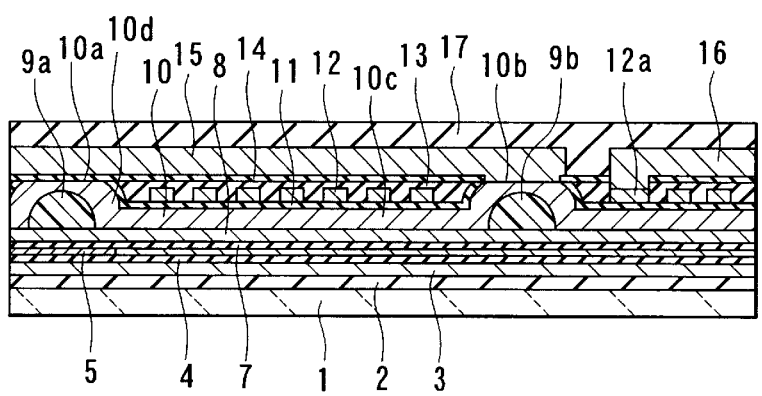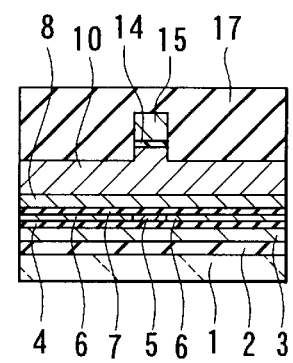
FIG. 10A  FIG. 10B
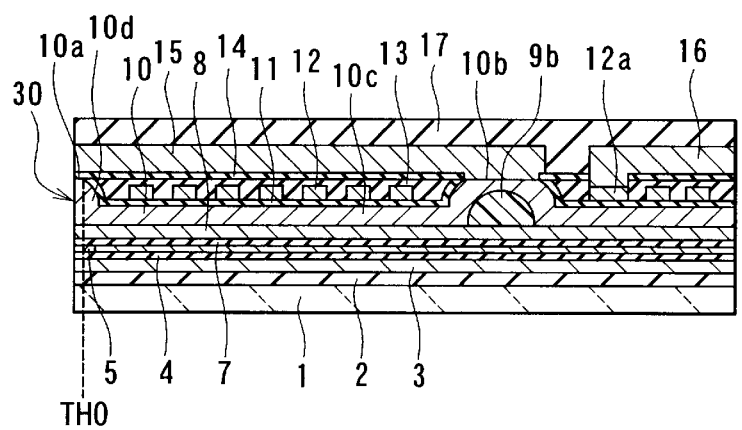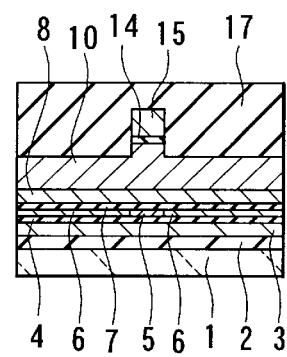
FIG. 11A  FIG. 11B

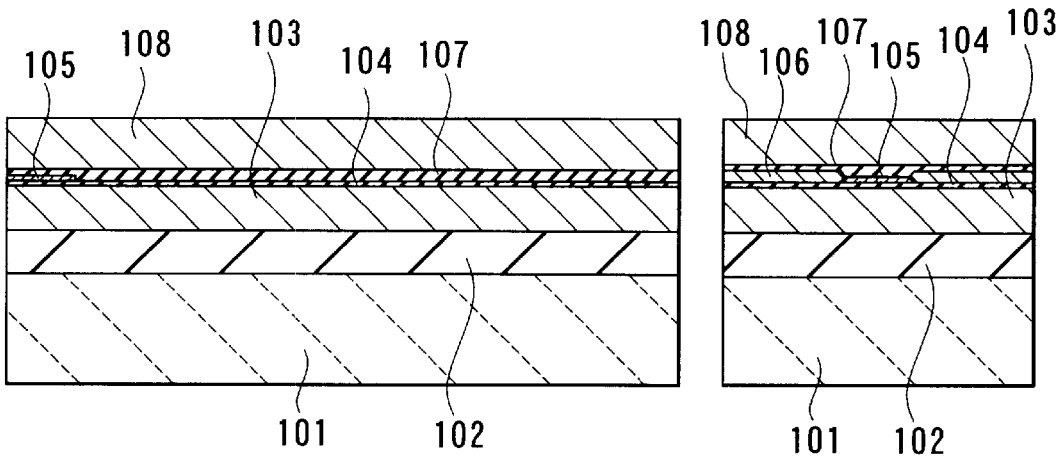
FIG. 25A
RELATED ART
FIG. 25B
RELATED ART
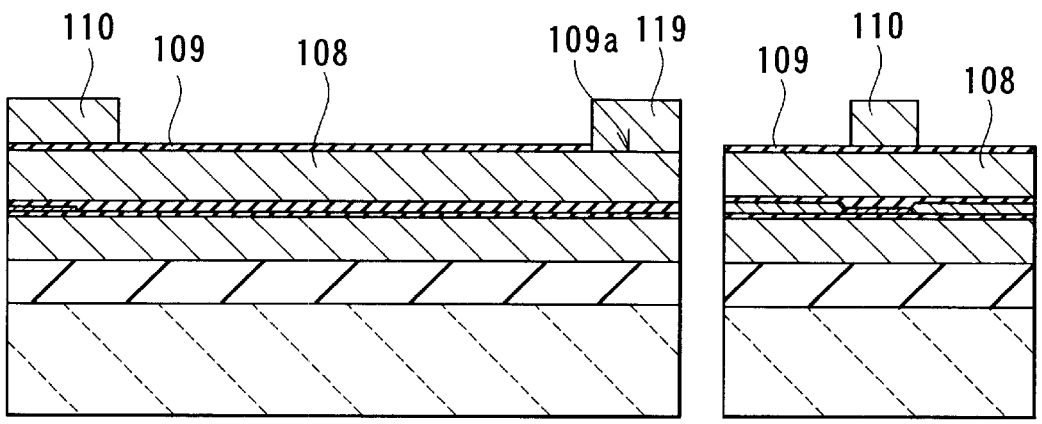
FIG. 26A
RELATED ART
FIG. 26B
RELATED ART

THIN-FILM MAGNETIC HEAD HAVING A MAGNETIC LAYER THAT DEFINES THROAT HEIGHT AND INCLUDES A SLOPED PORTION

BACKGROUND OF THE INVENTION

1. Field of the Invention

The present invention relates to a thin-film magnetic head having at least an induction-type electromagnetic transducer and a method of manufacturing such a thin-film magnetic head.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a recording head having an induction-type electromagnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface (medium facing surface) is reduced down to microns or the order of submicron. Semiconductor process techniques are utilized to implement such a structure. Reference is now made to FIG. 25A to FIG. 28A and FIG. 25B to FIG. 28B to describe an example of a method of manufacturing a composite thin-film magnetic head as an example of a related-art method of manufacturing a thin-film magnetic head. FIG. 25A to FIG. 28A are cross sections each orthogonal to an air bearing surface of the thin-film magnetic head. FIG. 25B to FIG. 28B are cross sections of a pole portion of the head each parallel to the air bearing surface.

In the manufacturing method, as shown in FIG. 25A and FIG. 25B, an insulating layer 102 made of alumina ($Al_2O_3$), for example, having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 $\mu$m is formed. The bottom pole layer 108 is made of a magnetic material and used for both a reproducing head and a recording head.

Next, as shown in FIG. 26A and FIG. 26B, on the bottom pole layer 108, a recording gap layer 109 made of an insulating film such as an alumina film whose thickness is 0.2 $\mu$m is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 27A and FIG. 27B, the recording gap layer 109 and the bottom pole layer 108 are etched through ion milling, using the top pole tip 110 as a mask. As shown in FIG. 27B, the structure is called a trim structure wherein the sidewalls of the top pole (the top pole tip 110), the recording gap layer 109, and a part of the bottom pole layer 108 are formed vertically in a self-aligned manner.

Next, an insulating layer 111 made of an alumina film, for example, and having a thickness of about 3 $\mu$m is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112. Heat treatment is then performed at a specific temperature to flatten the surface of the photoresist layer 113. On the photoresist layer 113, a second layer 114 of the thin-film oil is then formed. Next, a photoresist layer 115 is formed into a specific shape on the photoresist layer 113 and the second layer 114. Heat treatment is then performed at a specific temperature to flatten the surface of the photoresist layer 115.

Next, as shown in FIG. 28A and FIG. 28B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider including the foregoing layers is performed to form the air bearing surface 118 of the thin-film magnetic head including the recording head and the reproducing head. The thin-film magnetic head is thus completed.

FIG. 29 is a top view of the thin-film magnetic head shown in FIG. 28A and FIG. 28B. The overcoat layer 117 and the other insulating layers and insulating films are omitted in FIG. 29.

In FIG. 28A, 'TH' indicates the throat height and 'MR-H' indicates the MR height. The throat height is the length (height) of the pole portions, that is, the portions of the magnetic pole layers facing each other with the recording gap layer in between, between the air-bearing-surface-side end and the other end. The MR height is the length (height) between the air-bearing-surface-side end of the MR element and the other end. In FIG. 28B, 'P2W' indicates the pole width, that is, the recording track width. In addition to the throat height, the MR height and so on, the apex angle as indicated with θ in FIG. 28A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and track width P2W as shown in FIG. 28A and FIG. 28B.

To achieve high areal recording density, that is, to fabricate a recording head with a narrow track structure, it has been particularly required that track width P2W fall within the submicron order of 1.0 μm or less. It is therefore required to process the top pole into the submicron order through semiconductor process techniques.

A problem is that it is difficult to form the top pole layer of small dimensions on the apex.

As disclosed in Published Unexamined Japanese Patent Application Heisei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern having a width of the submicron order through the use of a photoresist film. Therefore, it is required to form a fine pattern of the submicron order on top of the apex through the use of a photoresist film having a thickness of 8 to 10 μm or more. However, it is extremely difficult to form a photoresist pattern having such a thickness with a reduced pattern width, due to restrictions in the manufacturing process.

Furthermore, rays of light used for exposure of photolithography are reflected off the base electrode film as the seed layer. The photoresist is exposed to the reflected rays as well and the photoresist pattern may go out of shape. It is therefore impossible to obtain a sharp and precise photoresist pattern.

In the sloped region of the apex, in particular, rays of light used for exposure that are reflected off the base electrode film include not only rays in the vertical direction but also those in the slanting or horizontal direction reflected off the slope of the apex. The photoresist is thus exposed to those rays of light and the photoresist pattern more greatly goes out of shape.

As disclosed in Published Unexamined Japanese Patent Application Heisei 6-68424 (1994), Published Unexamined Japanese Patent Application Heisei 6-309621 (1994) and Published Unexamined Japanese Patent Application Heisei 6-314413 (1994), for example, a thin-film magnetic head in which the top pole layer is formed on a flat surface has been proposed. Such a head solves the problem found in cases in which the top pole layer is formed on the apex.

The position of an end of the pole portion opposite to the air bearing surface is hereinafter called a zero throat height position. In the thin-film magnetic head disclosed in Published Unexamined Japanese Patent Application Heisei 6-68424 (1994), the zero throat height position is defined by an end of the top pole. In the thin-film magnetic head disclosed in Published Unexamined Japanese Patent Application Heisei 6-309621 (1994), the zero throat height position is defined by an end of the bottom pole. In the thin-film magnetic head disclosed in Published Unexamined Japanese Patent Application Heisei 6-314413 (1994), the zero throat height position is defined by an end of the top pole and an end of the bottom pole. In any of these heads the end that defines the zero throat height position is a surface orthogonal to the recording gap layer. Therefore, in any of these heads the space between the bottom and top pole layers from the air bearing surface to the zero throat height position has a specific length equal to the thickness of the recording gap layer. This space abruptly increases from the zero throat height position toward the side opposite to the air bearing surface.

In such a structure where the space between the bottom and top pole layers abruptly increases near the zero throat height position, however, the flow of magnetic flux passing through the pole layers toward the recording gap layer abruptly changes near the zero throat height position. As a result, the flux saturates near the zero throat height position, and the electromagnetic transducing characteristics of the thin-film magnetic head are reduced. The electromagnetic transducing characteristics are, to be specific, an overwrite property that is a parameter indicating one of characteristics when data is written over a region on a recording medium where data is already written, and a nonlinear transition shift (NLTS) characteristic, for example.

OBJECT AND SUMMARY OF THE INVENTION

It is an object of the invention to provide a thin-film magnetic head and a method of manufacturing the same for making a pole portion that defines the track width with accuracy and improving the electromagnetic transducing characteristics.

A thin-film magnetic head of the invention comprises: a medium facing surface that faces toward a recording medium; a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The first magnetic layer includes: the pole portion touching the gap layer; a flat portion located at a distance from the gap layer in the direction of thickness of the gap layer, and located farther from the medium facing surface than the pole portion; and a sloped portion connecting the pole portion and the flat portion to each other, the distance from the sloped portion to the gap layer decreasing with decreases in the distance from the sloped portion to the medium facing surface. The at least part of the thin-film coil is located on a side of the pole portion and the sloped portion of the first magnetic layer. The second magnetic layer includes a portion that touches a flat surface including the gap layer and defines a track width.

According to the thin-film magnetic head of the invention, the pole portion and the flat portion of the first magnetic layer are coupled to each other by the sloped portion. As a result, the flow of magnetic flux passing through the first magnetic layer toward the gap layer is smoothly changed from the flat portion to the pole portion. According to the thin-film magnetic head of the invention, at least a part of the thin-film coil is located on a side of the pole portion and the sloped portion of the first magnetic layer. In addition, the second magnetic layer includes the portion that touches a flat surface including the gap layer and defines the track width. It is thereby possible to form the pole portion defining the track width with accuracy.

According to the thin-film magnetic head of the invention, the sloped portion may have a curved surface that faces toward the gap layer.

The thin-film magnetic head of the invention may further comprise an insulating layer that covers the at least part of the coil located on the side of the pole portion and the sloped portion of the first magnetic layer, and has a surface facing toward the gap layer, the surface being flattened together with a surface of the pole portion of the first magnetic layer facing toward the gap layer.

The thin-film magnetic head of the invention may further comprise: a magnetoresistive element; and a first shield layer and a second shield layer for shielding the magnetoresistive element, the shield layers including portions located on a side of the medium facing surface and opposed to each other, the magnetoresistive element being placed between the shield layers. In this case, it is possible that the flat portion of the first magnetic layer is adjacent to the second shield layer, and that an isolating layer is provided between the pole portion and the sloped portion of the first magnetic layer and the second shield layer, the isolating layer isolating the pole portion and the sloped portion from the second shield layer, and defining shapes of the pole portion and the sloped portion. The isolating layer may be made of a nonmagnetic material.

A method of the invention is provided for manufacturing a thin-film magnetic head comprising: a medium facing surface that faces toward a recording medium; a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The first magnetic layer includes: the pole portion touching the gap layer; a flat portion located at a distance from the gap layer in the direction of thickness of the gap layer, and located farther from the medium facing surface than the pole portion; and a sloped portion connecting the pole portion and the flat portion to each other, the distance from the sloped portion to the gap layer decreasing with decreases in the distance from the sloped portion to the medium facing surface. The at least part of the thin-film coil is located on a side of the pole portion and the sloped portion of the first magnetic layer. The second magnetic layer includes a portion that touches a flat surface including the gap layer and defines a track width. The method includes the steps of forming a convexity in a region on a base layer of the first magnetic layer, the region corresponding to the pole portion of the first magnetic layer; forming the first magnetic layer on the base layer and the convexity such that the flat portion is formed on the base layer, and a portion covering the convexity forms the pole portion and the sloped portion; forming the gap layer on the pole portion of the first magnetic layer; forming the second magnetic layer on the gap layer; forming the thin-film coil such that the at least part of the coil is located on the side of the pole portion and the sloped portion of the first magnetic layer; and forming the medium facing surface by polishing the first magnetic layer, the gap layer and the second magnetic layer.

According to the method of the invention, the convexity is formed on the base layer of the first magnetic layer, and the first magnetic layer is formed on the convexity. The first magnetic layer including the pole portion, the flat portion and the sloped portion is thereby formed. The flow of magnetic flux passing through the first magnetic layer toward the gap layer is smoothly changed from the flat portion to the pole portion. According to the method of the invention, at least a part of the thin-film coil is located on a side of the pole portion and the sloped portion of the first magnetic layer. In addition, the second magnetic layer includes the portion that touches a flat surface including the gap layer and defines the track width. It is thereby possible to form the pole portion defining the track width with accuracy.

According to the method of the invention, the sloped portion may be formed to have a curved surface that faces toward the gap layer. In this case, the convexity may be formed to have a curved top surface, too.

The method of the invention may further include the step of forming an insulating layer that covers the at least part of the coil located on the side of the pole portion and the sloped portion of the first magnetic layer, and has a surface facing toward the gap layer, the surface being flattened together with a surface of the pole portion of the first magnetic layer facing toward the gap layer.

According to the method of the invention, the convexity or a part thereof may be removed in the step of forming the medium facing surface.

According to the method of the invention, the convexity may be made of a resist layer that has received heat treatment or a metal plating layer.

The method of the invention may further include the step of forming: a magnetoresistive element; and a first shield layer and a second shield layer for shielding the magnetoresistive element, the shield layers including portions located on a side of the medium facing surface and opposed to each other, the magnetoresistive element being placed between the shield layers. In this case, the flat portion of the first magnetic layer may be located adjacent to the second shield layer, and an isolating layer may be provided between the pole portion and the sloped portion of the first magnetic layer and the second shield layer, the isolating layer isolating the pole portion and the sloped portion from the second shield layer, and forming the convexity and defining shapes of the pole portion and the sloped portion. The isolating layer may be made of a nonmagnetic material.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 6A and FIG. 6B are cross sections for illustrating a step that follows FIG. 5A and FIG. 5B.

FIG. 7A and FIG. 7B are cross sections for illustrating a step that follows FIG. 6A and FIG. 6B.

FIG. 8A and FIG. 8B are cross sections for illustrating a step that follows FIG. 7A and FIG. 7B.

FIG. 9A and FIG. 9B are cross sections for illustrating a step that follows FIG. 8A and FIG. 8B.

FIG. 10A and FIG. 10B are cross sections for illustrating a step that follows FIG. 9A and FIG. 9B.

FIG. 11A and FIG. 11B are cross sections of the thin-film magnetic head of the first embodiment.

FIG. 25A and FIG. 25B are cross sections for illustrating a step in a method of manufacturing a thin-film magnetic head of related art.

FIG. 26A and FIG. 26B are cross sections for illustrating a step that follows FIG. 25A and FIG. 25B.

DETAILED DESCRIPTION OF THE PREFERRED EMBODIMENTS

Figure 12:
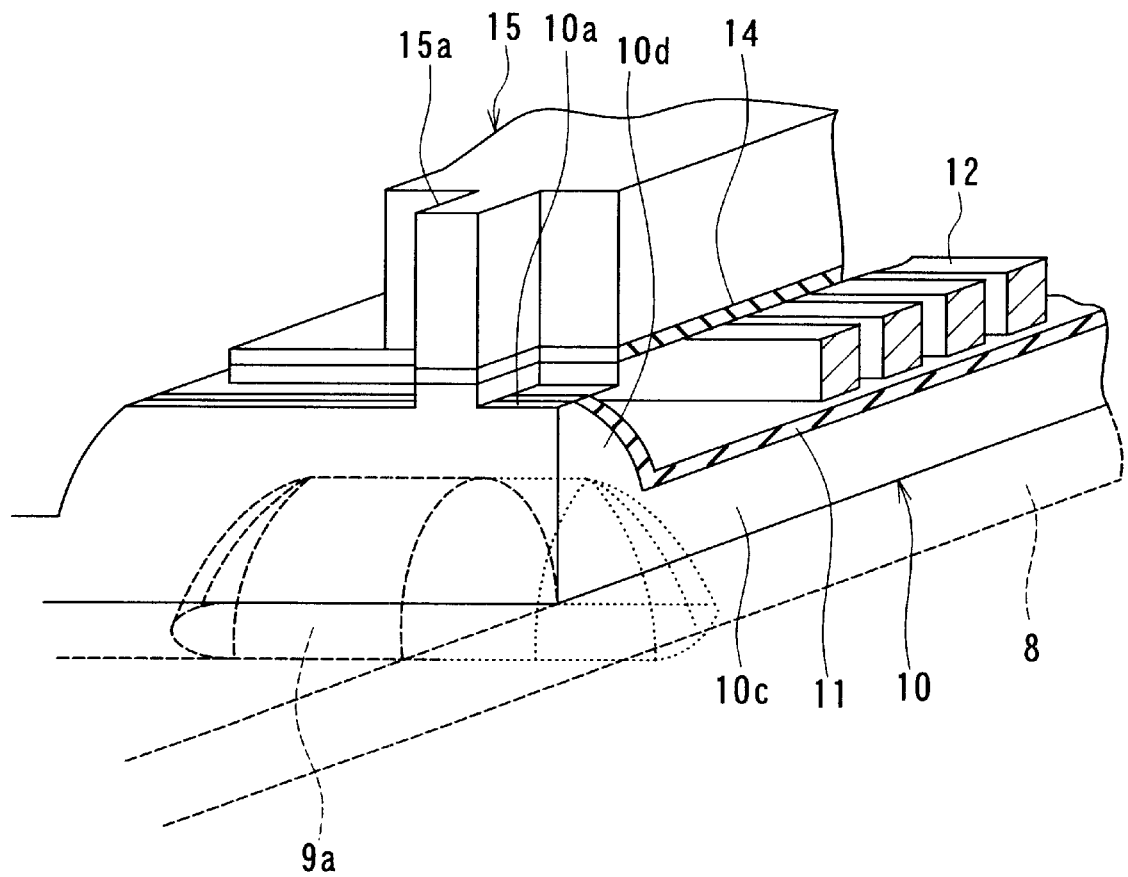
FIG. 12 is a partially-cutaway perspective view of the main part of the thin-film magnetic head of the first embodiment.

Preferred embodiments of the invention will now be described in detail with reference to the accompanying drawings.

First Embodiment

Reference is now made to FIG. 1A to FIG. 11A and FIG. 1B to FIG. 11B to describe a thin-film magnetic head and a method of manufacturing the same of a first embodiment of the invention. FIG. 1A to FIG. 10A are cross sections each orthogonal to an air bearing surface. FIG. 1B to FIG. 10B are cross sections to be the air bearing surface. In FIG. 1A the level to be the air bearing surface, that is, the level along which each of the cross sections of FIG. 1B to FIG. 10B is taken, is indicated with an alternate long and short dash line. FIG. 11A is a cross section orthogonal to the air bearing surface. FIG. 11B is a cross section of a portion near the air bearing surface that is parallel to the air bearing surface.

In the manufacturing method, as shown in FIG. 1A and FIG. 1B, an insulating layer 2 made of alumina ($Al_2O_3$), for example, whose thickness is about 5 µm, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 µm is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 µm, for example, is formed over the entire surface. This insulating layer is polished through chemical mechanical polishing (CMP), for example, so that the bottom shield layer 3 is exposed, and the surface is flattened.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina films are fabricated through CVD, trimethyl aluminum ($Al(CH_3)_3$) and $H_2O$, for example, are used. Through the use of CVD, it is possible to make the thin and precise shield gap films 4 and 7 with few pinholes.

Next, on the top shield gap film 7, a top shield layer 8 for a reproducing head is selectively formed. The top shield layer 8 is made of a magnetic material and has a thickness of about 1.0 to 1.5 µm.

Next, as shown in FIG. 3A and FIG. 3B, convexity forming layers 9a and 9b are formed in the region on the top shield layer 8 corresponding to the pole portion of a bottom pole layer described later, and in the region on the top shield layer 8 corresponding to a portion connecting the bottom pole layer to a top pole layer described later, respectively.

The top surface of each of the convexity forming layers 9a and 9b forms a curved surface. To be specific, the top surface of each of the convexity forming layers 9a and 9b forms part of a cylindrical surface formed around an axis parallel to the air bearing surface and parallel to a recording gap layer described later. The convexity forming layers 9a and 9b may be made of a resist such as a photoresist, or metal. The method of forming the convexity forming layers 9a and 9b will be described later in detail.

Next, as shown in FIG. 4A and FIG. 4B, the bottom pole layer 10 for a recording head is formed on the top shield layer 8 and the convexity forming layers 9a and 9b. The bottom pole layer 10 is made of a magnetic material and has a thickness of about 1 to 5 µm.

The top shield layer 8 and the bottom pole layer 10 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, as shown in FIG. 5A and FIG. 5B, an insulating film 11 of alumina, for example, having a thickness of about 0.3 to 0.6 µm is formed over the entire surface.

Next, as shown in FIG. 6A and FIG. 6B, a thin-film coil 12 made of copper (Cu), for example, is formed on the insulating film 11 by a method such as frame plating. For example, the thickness of the coil 12 is about 1.0 to 2.0 µm and the pitch is 0.3 to 2.0 µm. The coil 12 is wound around the convexity forming layer 9b, and a part of the coil 12 is located between the convexity forming layers 9a and 9b. In the drawings numeral 12a indicates a portion for connecting the coil 12 to a conductive layer (lead) described later.

Next, as shown in FIG. 7A and FIG. 7B, an insulating layer 13 of alumina, for example, having a thickness of about 3 to 4 µm is formed over the entire surface. The insulating layer 13 is then polished through CMP, for example, so that portions of the bottom pole layer 10 located on the convexity forming layers 9a and 9b are exposed, and the surface is flattened. Although the coil 12 is not exposed in FIG. 7A and FIG. 7B, the coil 12 may be exposed.

The portion of the bottom pole layer 10 located on the convexity forming layer 9a and exposed through the above-mentioned flattening processing is a pole portion 10a of the bottom pole layer 10. The portion of the bottom pole layer 10 located on the convexity forming layer 9b and exposed through the above-mentioned flattening processing is a portion 10b to be connected to the top pole layer described later. In this embodiment a flat portion of the bottom pole layer 10 located on the top shield layer 8 is called a flat portion 10c. A portion connecting the pole portion 10a to the flat portion 10c is called a sloped portion 10d. As the distance from the sloped portion 10d to the air bearing surface decreases, the distance from the sloped portion 10d to the recording gap layer decreases.

Next, as shown in FIG. 8A and FIG. 8B, a recording gap layer 14 made of an insulating material whose thickness is 0.2 to 0.3 µm, for example, is formed on the pole portion 10a and the connecting potion 10b of the bottom pole layer 10 that are exposed and the insulating layer 13. In general, the insulating material used for the recording gap layer 14 may be alumina, aluminum nitride, a silicon-dioxide-base material, a silicon-nitride-base material, or diamond-like carbon (DLC) and so on. The recording gap layer 14 may be fabricated through sputtering or CVD. If the gap layer 14 made of alumina film is fabricated through CVD, trimethyl aluminum (Al(CH$_3$)$_3$) and H$_2$O, for example, are used. Through the use of CVD, it is possible to make the thin and precise gap layer 14 with few pinholes.

Next, a portion of the recording gap layer 14 located on top of the connecting portion 10b is etched to form a contact hole for making the magnetic path. In addition, portions of the gap layer 14 and the insulating layer 13 located on top of the portion 12a of the coil 12 are etched to form another contact hole.

Next, as shown in FIG. 9A and FIG. 9B, a top pole layer 15 having a thickness of about 2.0 to 3.0 µm is formed on a region of the recording gap layer 14 extending from a portion on the pole portion 10a to a portion on the connecting portion 10b. At the same time, the conductive layer 16 having a thickness of about 2.0 to 3.0 µm is formed to be connected to the portion 12a of the thin-film coil 12. The top pole layer 15 is connected to the connecting portion 10b of the bottom pole layer 10 through the contact hole formed in the portion on top of the connecting portion 10b. The top pole layer 15 is thereby magnetically coupled to the bottom pole layer 10.

The top pole layer 15 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used. To improve the high frequency characteristics, the top pole layer 15 may be made of layers of inorganic insulating films and magnetic layers of Permalloy, for example.

Next, the recording gap layer 14 is selectively etched through dry etching, using the top pole layer 15 as a mask. This dry etching may be reactive ion etching (RIE) using a chlorine-base gas such as BCl$_2$ or Cl$_2$, or a fluorine-base gas such as CF$_4$ or SF$_6$, for example. Next, the pole portion 10a of the bottom pole layer 10 is selectively etched by about 0.3 to 0.6 µm through argon ion milling, for example. A trim structure as shown in FIG. 9B is thus formed. The trim structure suppresses an increase in the effective track width due to expansion of a magnetic flux generated during writing in a narrow track.

Next, as shown in FIG. 10A and FIG. 10B, an overcoat layer 17 of alumina, for example, having a thickness of 20 to 40 µm is formed over the entire surface. The surface of the overcoat layer 17 is then flattened and pads (not shown) for electrodes are formed on the overcoat layer 17.

Finally, as shown in FIG. 11A and FIG. 11B, lapping of the slider including the foregoing layers is performed to form the air bearing surface 30 of the thin-film magnetic head including the recording head and the reproducing head. The thin-film magnetic head of the embodiment is thus completed. In this embodiment the convexity forming layer 9a is completely removed in the step of forming the air bearing surface 30. In FIG. 11A 'TH0' indicates the zero throat height position. FIG. 11B is a cross section of a portion near the air bearing surface 30.

FIG. 12 is a partially-cutaway perspective view illustrating a neighborhood of the pole portion of the thin-film magnetic head of this embodiment. As shown, the top pole layer 15 includes a portion 15a that touches the flat top surface of the recording gap layer 14 and defines the recording track width.

In this embodiment the bottom pole layer 10 corresponds to the first magnetic layer of the invention. The top pole layer 15 corresponds to the second magnetic layer of the invention. The convexity forming layer 9a corresponds to the convexity of the invention. The bottom shield layer 3 corresponds to the first shield layer of the invention. The top shield layer 8 corresponds to the second shield layer of the invention, and to the base layer of the first magnetic layer of the invention.

Three examples of method of forming the convexity forming layers 9a and 9b will now be described in detail. Although the method of forming the layer 9a will be described, this method similarly applies to the method of forming the layer 9b.

Figure 13:
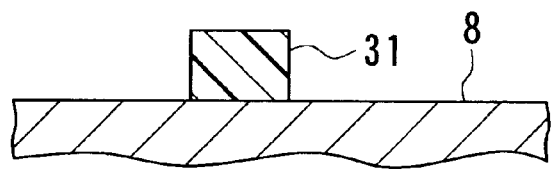
FIG. 13 is a cross section for illustrating a first example of a method of forming a convexity of the first embodiment.
Figure 14:
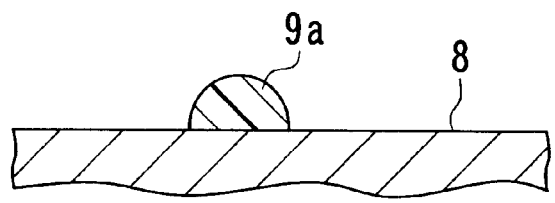
FIG. 14 is a cross section for illustrating the first example of the method of forming the convexity of the first embodiment.

In the first example, as shown in FIG. 13, a resist layer 31 of a specific shape is formed in a region on the top shield layer 8 where the convexity forming layer 9a is to be formed. Next, as shown in FIG. 14, the resist layer 31 undergoes heat treatment (is cured) so that the surface is curved. The resist layer 31 is thereby formed into the convexity forming layer 9a.

Figure 15:
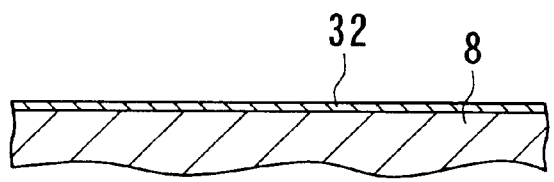
FIG. 15 is a cross section for illustrating a second example of the method of forming the convexity of the first embodiment.
Figure 16:
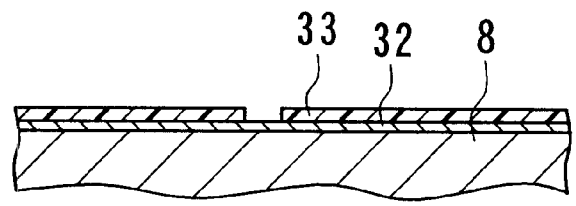
FIG. 16 is a cross section for illustrating the second example of the method of forming the convexity of the first embodiment.

In the second example, as shown in FIG. 15, a seed layer (electrode film) 32 for plating is formed on the top shield layer 8. The seed layer 32 may be made of metal such as Au, Cu, Ni, NiCu, NiFe, NiFeCo or FeCo. Next, as shown in FIG. 16, a resist layer 33 is formed on the seed layer 32 through photolithography. The resist layer 33 has an opening where the convexity forming layer 9a is to be formed. The resist layer 33 has a thickness smaller than the height of the convexity forming layer 9a to be formed. The opening of the resist layer 33 has a width smaller than the height of the layer 9a.

Figure 17:
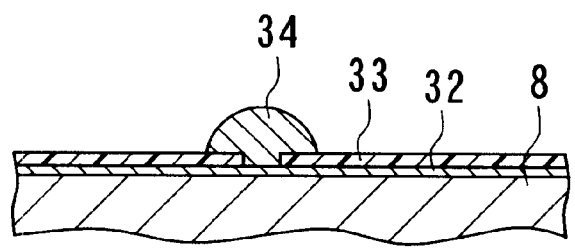
FIG. 17 is a cross section for illustrating the second example of the method of forming the convexity of the first embodiment.
Figure 18:
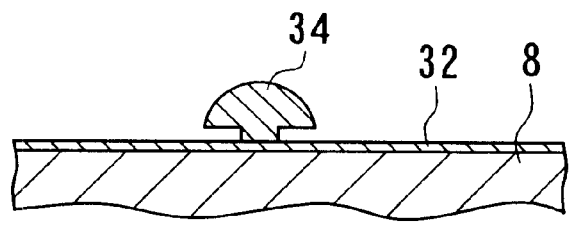
FIG. 18 is a cross section for illustrating the second example of the method of forming the convexity of the first embodiment.
Figure 19:
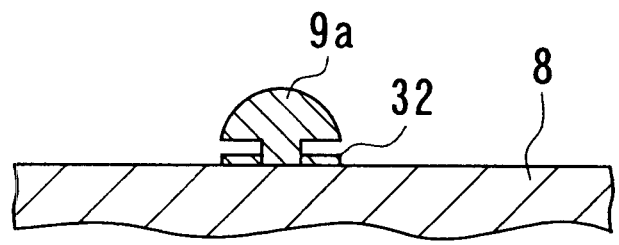
FIG. 19 is a cross section for illustrating the second example of the method of forming the convexity of the first embodiment.

Next, as shown in FIG. 17, a plating layer 34 is formed on the seed layer 32 with the resist layer 33 as a mask. The plating layer 34 has a thickness greater than the thickness of the resist layer 33, and greater than the width of the opening of the resist layer 33. The plating layer 34 hangs over the periphery of the opening of the resist layer 33, and has a curved surface as shown in FIG. 17. The plating layer 34 may be made of metal such as Au, Cu, Ni, NiCu, NiFe, NiFeCo or FeCo. Next, as shown in FIG. 18, the resist layer 33 is lifted off through the use of an organic solvent. Next, as shown in FIG. 19, the seed layer 32 is removed by dry etching such as ion milling, or wet etching. The remainder of the plating layer 34 forms the convexity forming layer 9a. If the seed layer 32 is removed by dry etching, a portion of the seed layer 32 remains below the plating layer 34 as shown in FIG. 19. Although a gap is formed between the plating layer 34 and the top shield layer 8 in the second example, as shown in FIG. 19, this gap will not affect formation of the bottom pole layer 10.

In the above-described second example, it is possible that the seed layer used for making the top shield layer 8 by plating is left unremoved, without providing the seed layer 32, and this seed layer is used for making the plating layer 34.

Figure 20:
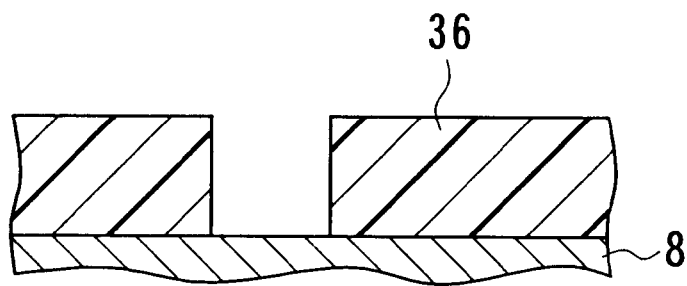
FIG. 20 is a cross section for illustrating a third example of the method of forming the convexity of the first embodiment.
Figure 21:
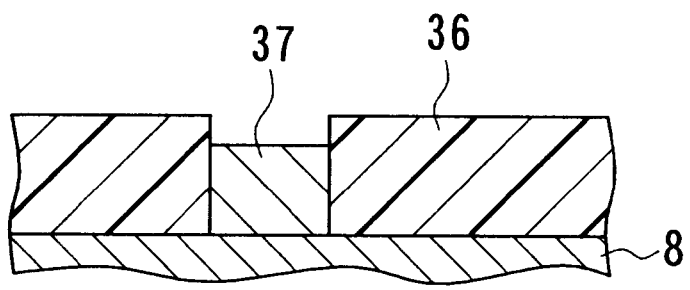
FIG. 21 is a cross section for illustrating the third example of the method of forming the convexity of the first embodiment.
Figure 22:
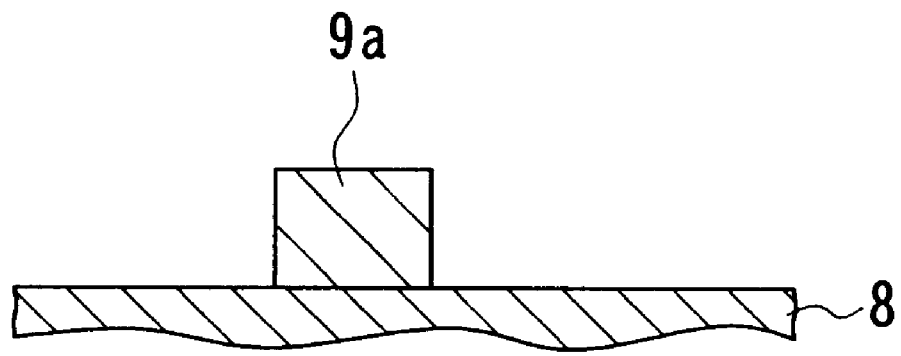
FIG. 22 is a cross section for illustrating the third example of the method of forming the convexity of the first embodiment.

In the third example, as shown in FIG. 20, a resist layer 36 is formed on the top shield layer 8 through photolithography. The resist layer 36 has an opening where the convexity forming layer 9a is to be formed. The resist layer 36 has a thickness smaller than the height of the convexity forming layer 9a to be formed. The seed layer used for making the top shield layer 8 by plating is left unremoved. Next, as shown in FIG. 21, a plating layer 37 is formed on the top shield layer 8 through the use of the resist layer 36 as a frame and the seed layer used for making the top shield layer 8. The plating layer 37 may be made of metal such as Au, Cu, Ni, NiCu, NiFe, NiFeCo or FeCo. Next, as shown in FIG. 22, the resist layer 36 is lifted off through the use of an organic solvent. The remainder of the plating layer 37 forms the convexity forming layer 9a.

Figure 23:
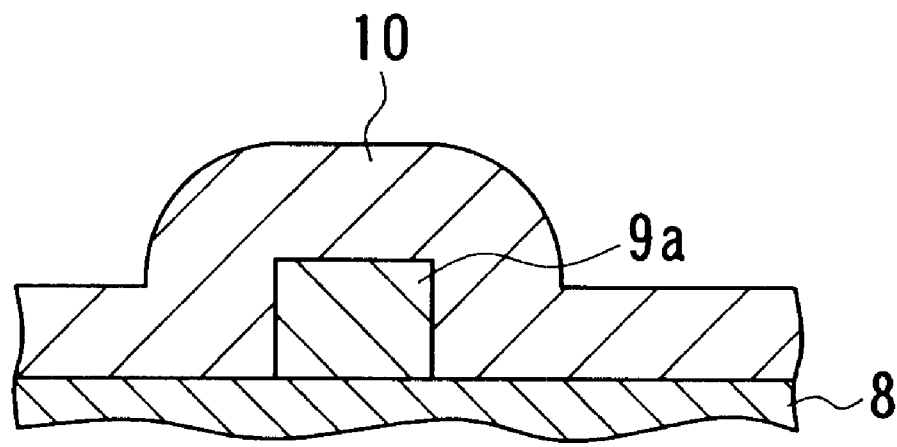
FIG. 23 is a cross section for illustrating the third example of the method of forming the convexity of the first embodiment.

The convexity forming layer 9a formed through the third example is rectangular in cross section and does not have a curved surface, as shown in FIG. 22, which is different from the layer 9a of the first and second examples. However, if the bottom pole layer 10 is formed to cover the layer 9a, as shown in FIG. 23, a surface of the sloped portion of the bottom pole layer 10 is curved.

As described so far, the thin-film magnetic head of the embodiment comprises the air bearing surface (the medium facing surface that faces toward a recording medium) 30, the reproducing head and the recording head. The reproducing head has: the MR element 5; and the bottom shield layer 3 and the top shield layer 8 for shielding the MR element 5. Portions of the bottom shield layer 3 and the top shield layer 8 on a side of the air bearing surface 30 are opposed to each other, the MR element 5 being placed between these portions.

The recording head has the bottom pole layer 10 and the top pole layer 15 magnetically coupled to each other, each of which includes at least one layer. The bottom pole layer 10 and the top pole layer 15 include the pole portions opposed to each other and placed in regions on a side of the air bearing surface 30. The recording head further has: the recording gap layer 14 placed between the pole portion of the bottom pole layer 10 and the pole portion of the top pole layer 15; and the thin-film coil 12 at least a part of which is placed between the bottom pole layer 10 and the top pole layer 15, the at least part of the coil 12 being insulated from the bottom pole layer 10 and the top pole layer 15.

In this embodiment the bottom pole layer 10 has the pole portion 10a, the flat portion 10c, and the sloped portion 10d. The pole portion 10a touches the recording gap layer 14. The flat portion 10c is located at a distance from the gap layer 14 in the direction of thickness of the gap layer 14, and located farther from the air bearing surface 30 than the pole portion 10a. The sloped portion 10d connects the pole portion 10a and the flat portion 10c to each other. The distance from the sloped portion 10d to the gap layer 14 decreases as the distance from the sloped portion 10d to the air bearing surface 30 decreases. The sloped portion 10d has a curved surface that faces toward the gap layer 14. The throat height is defined by an end of the pole portion 10a farther from the air bearing surface 30.

A part of the thin-film coil 12 is located on a side of the pole portion 10a and the sloped portion 10d of the bottom pole layer 10. The top pole layer 15 includes the portion 16a that is a flat layer touching the flat top surface of the recording gap layer 14 and defines the track width.

According to the embodiment, the thin-film coil 12 is located on the flat portion 10c and on a side of the pole portion 10a and the sloped portion 10d of the bottom pole layer 10. The top surface of the insulating layer 13 covering the coil 12 is flattened, together with the top surface of the pole portion 10a. It is thereby possible that the top pole layer 15 including the portion 15a defining the recording track width is formed on the flat surface. As a result, it is possible to form the top pole layer 15 with accuracy even if the recording track width is reduced down to the half-micron or quarter-micron order. Precise control of the recording track width is thereby achieved.

According to the embodiment, the throat height is defined by the end of the pole portion 10a farther from the air bearing surface 30. In addition, the sloped portion 10d is provided between the pole portion 10a and the flat portion 10c. The distance from the sloped portion 10d to the recording gap layer 14 decreases as the distance from the sloped portion 10d to the air bearing surface 30 decreases. As a result, the magnetic flux passing through the bottom pole layer 10 toward the recording gap layer 14 is smoothly changed from the flat portion 10c to the pole portion 10a. It is thereby possible that the flow of flux passing through the bottom pole layer 10 toward the gap layer 14 is smoothly changed near zero throat height position TH0. It is therefore possible to improve the electromagnetic transducing characteristics of the recording head such as the overwrite property and NLTS.

According to the embodiment, the sloped portion 10d has the curved surface that faces toward the gap layer 14. It is thereby possible to change the flow of flux more smoothly.

According to the method of manufacturing the thin-film magnetic head of the embodiment, the convexity forming layer 9a is formed in the region on the top shield layer 8 that is the base layer of the bottom pole layer 10, the region corresponding to the pole portion 10a of the bottom pole layer 10. The bottom pole layer 10 is then formed on the top shield layer 8 and the convexity forming layer 9a, so that the flat portion 10c is formed on the top shield layer 8, and the portion covering the layer 9a forms the pole portion 10a and the sloped portion 10d. As a result, it is easy to form the bottom pole layer 10 including the pole portion 10a, the flat portion 10c and the sloped portion 10d.

According to the embodiment, the thin-film coil 12 is located on a side of the pole portion 10a and the sloped portion 10d of the bottom pole layer 10 and formed on the flat insulating film 11. It is thereby possible to form the coil 12 of small dimensions with accuracy. Furthermore, it is possible to place an end of the coil 12 near the sloped portion 10d since no apex exists. A reduction in the yoke length is thereby achieved.

According to the embodiment, it is possible that the entire length of the coil 12 is greatly reduced without changing the number of turns of the coil 12 since a reduction in the yoke length is achieved. It is thereby possible to reduce the resistance of the coil 12 and to reduce the thickness thereof.

According to the embodiment, the insulating film 11 is provided between the bottom pole layer 10 and the thin-film coil 12. The insulating film 11 is thin and made of an inorganic material that achieves sufficient insulation strength. High insulation strength is thereby obtained between the bottom pole layer 10 and the coil 12.

In the embodiment the thin-film coil 12 is covered with the insulating layer 13 made of an inorganic insulating material. It is thereby possible to prevent the pole portions from protruding toward a recording medium due to expansion resulting from heat generated around the coil 12 when the thin-film magnetic head is used.

Second Embodiment

Figure 24A:
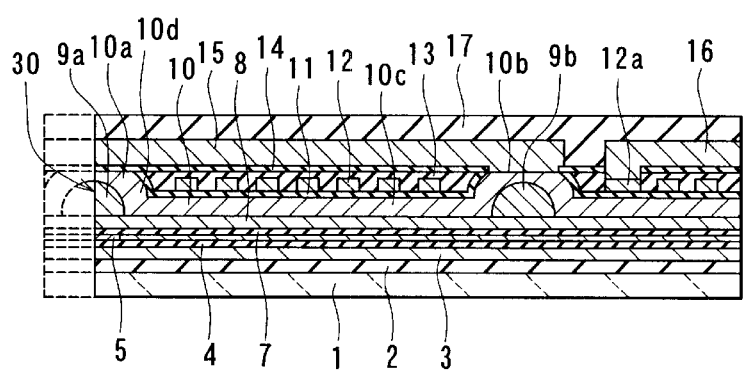
FIG. 24A and FIG. 24B are cross sections of a thin-film magnetic head of a second embodiment of the invention.
Figure 24B:
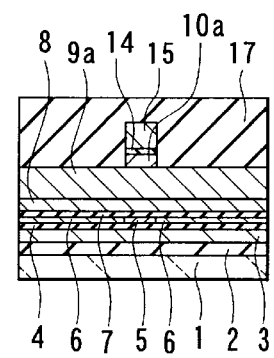
Figures 27A, 27B:
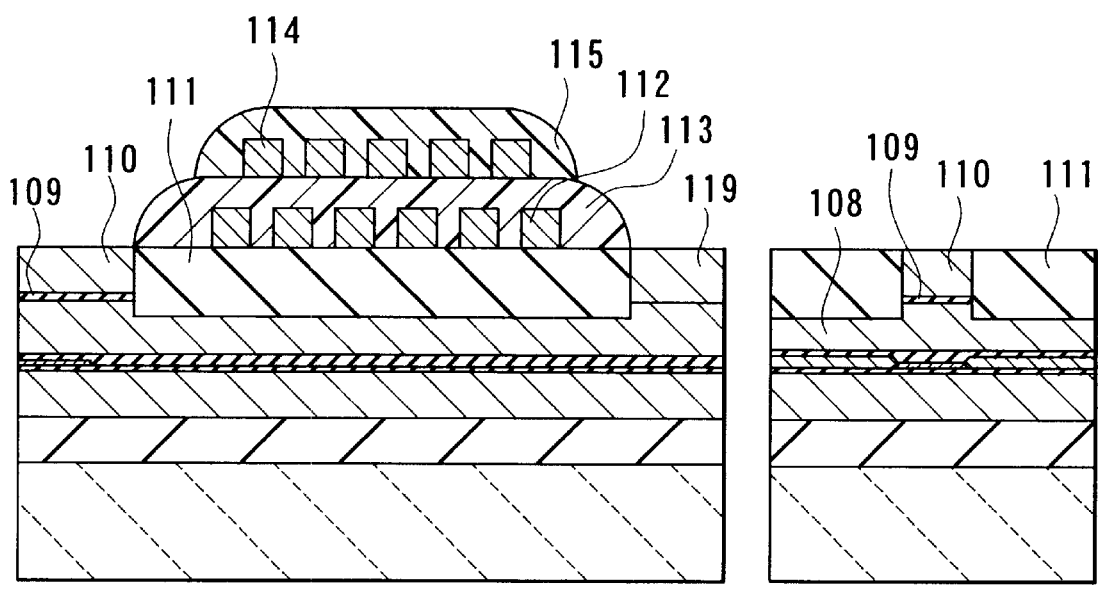
FIG. 27A and FIG. 27B are cross sections for illustrating a step that follows FIG. 26A and FIG. 26B.
Figures 28A, 28B:
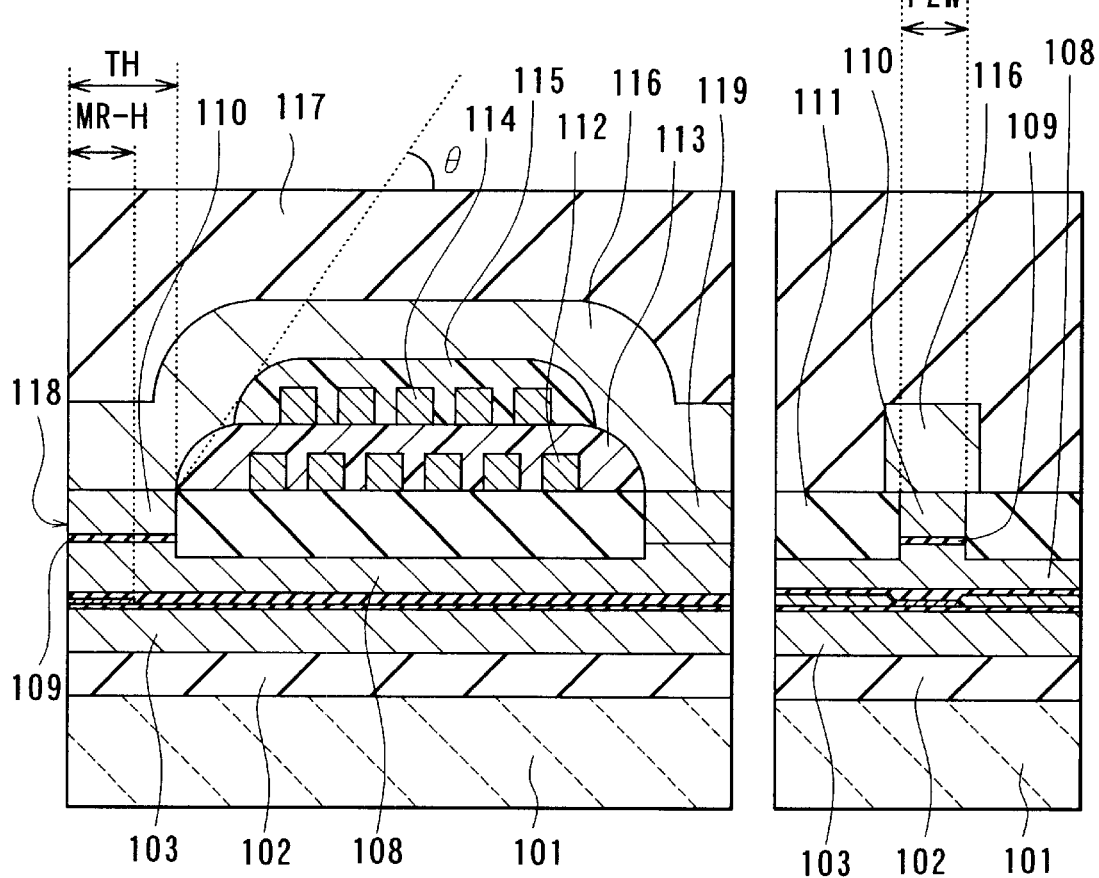
FIG. 28A and FIG. 28B are cross sections for illustrating a step that follows FIG. 27A and FIG. 27B.
Figure 29:
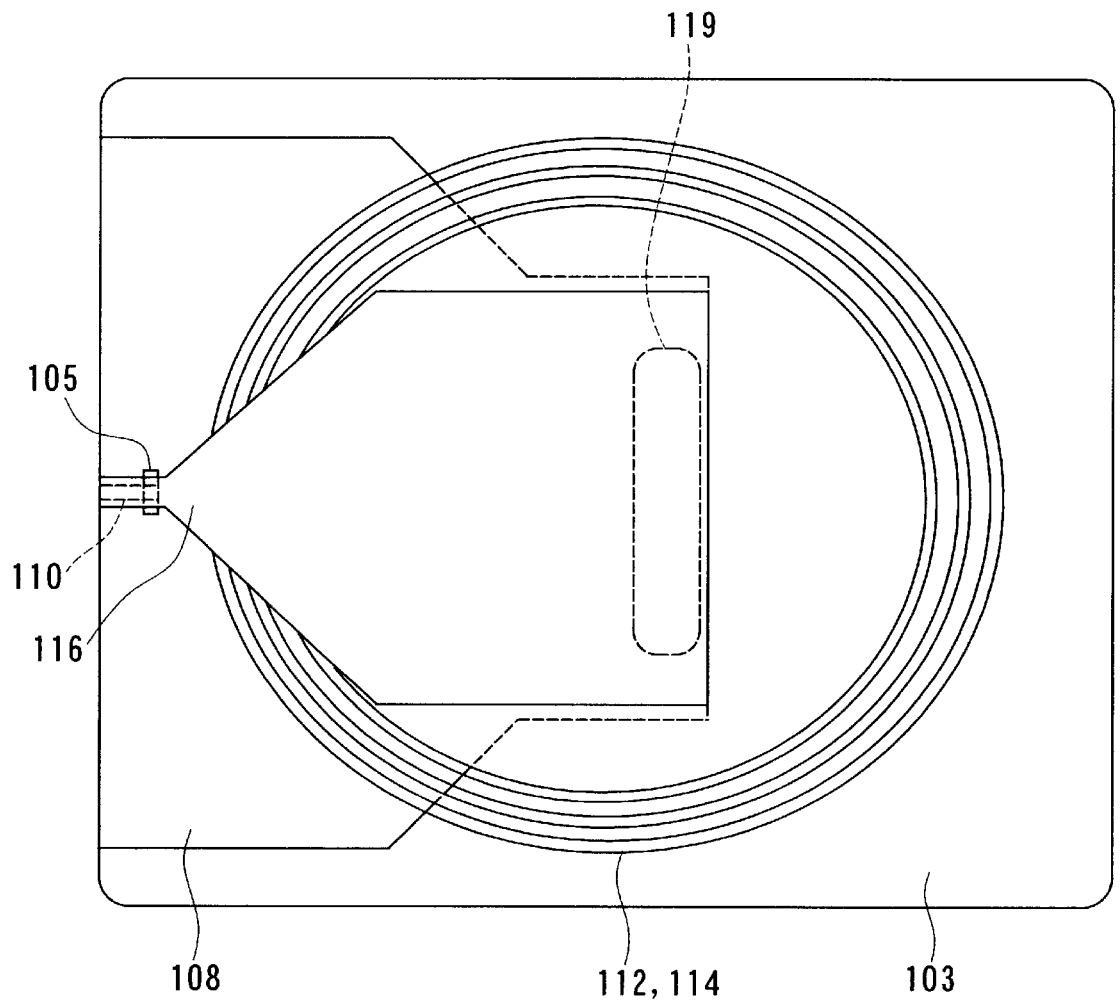
FIG. 29 is a top view of the related-art thin-film magnetic head.

Reference is now made to FIG. 24A and FIG. 24B to describe a thin-film magnetic head and a method of manufacturing the same of a second embodiment of the invention. FIG. 24A is a cross section orthogonal to an air bearing surface of the thin-film magnetic head. FIG. 24B is a cross section of a portion near the air bearing surface that is parallel to the air bearing surface.

In the manufacturing method, a part of the convexity forming layer 9a is removed while the rest of the layer 9a is left in the thin-film magnetic head in the step of forming the air bearing surface 30. As a result, the thin-film magnetic head of the second embodiment has the convexity forming layer 9a located near the air bearing surface 30. The convexity forming layer 9a isolates the top shield layer 8 and the bottom pole layer 10 from each other, and defines the shapes of the pole portion 10a and the sloped portion 10d of the bottom pole layer 10. The convexity forming layer 9a corresponds to the isolating layer of the invention.

In this embodiment the convexity forming layer 9a is preferably made of corrosion resistant metal such as Au or Ni if no protection film is formed on the air bearing surface 30 of the head. Besides corrosion resistant metal, the layer 9a may be made of metal having no corrosion resistance or a resist if a protection film is formed on the air bearing surface 30.

According to the second embodiment, the top shield layer 8 and the bottom pole layer 10 are isolated from each other by the convexity forming layer 9a near the air bearing surface 30 of the head. A magnetic effect on the top shield layer 8 is thereby reduced when the recording head is in operation. Consequently, the magnetic domain of the top shield layer 8 is stabilized. As a result, it is possible to reduce so-called popcorn noise, that is, pulse-shaped noise generated in a read signal after a writing operation of the recording head is completed, and to improve the characteristics of the composite thin-film magnetic head. This effect is particularly noticeable if the convexity forming layer 9a is made of a nonmagnetic material.

The remainder of configuration, functions and effects of the second embodiment are similar to those of the first embodiment.

The present invention is not limited to the foregoing embodiments but may be practiced in still other ways. For example, although the top pole layer 15 is made up of a single layer in the foregoing embodiments, it may be made up of a plurality of layers. In this case, the layer including the portion defining the recording track width is formed to touch the flat surface including the gap layer.

In the foregoing embodiments, the thin-film magnetic head is disclosed, comprising the MR element for reading formed on the base body and the induction-type electromagnetic transducer for writing stacked on the MR element. Alternatively, the MR element may be stacked on the electromagnetic transducer.

That is, the induction-type electromagnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with the recording gap film in between. In this case it is preferred that the top pole layer of the induction-type electromagnetic transducer functions as the bottom shield layer of the MR element, too.

The invention may be applied to a thin-film magnetic head dedicated to writing that has an induction-type electromagnetic transducer only or to a thin-film magnetic head performing writing and reading through an induction-type electromagnetic transducer.

According to the thin-film magnetic head or the method of manufacturing the same of the invention described so far, the first magnetic layer includes the pole portion, the flat portion and the sloped portion. As a result, the flow of magnetic flux passing through the first magnetic layer toward the gap layer is smoothly changed. The electromagnetic transducing characteristics are thereby improved. According to the invention, at least a part of the thin-film coil is located on a side of the pole portion and the sloped portion of the first magnetic layer. In addition, the second magnetic layer includes the portion that touches a flat surface including the gap layer, and defines the track width. It is thereby possible to form the pole portion defining the track width with accuracy.

According to the thin-film magnetic head or the method of manufacturing the same of the invention, the sloped portion may have a curved surface that faces toward the gap layer. The flow of flux is thereby changed more smoothly.

According to the thin-film magnetic head or the method of manufacturing the same of the invention, it is possible to further provide the magnetoresistive element and the first and second shield layers, and the isolating layer located between the pole portion and the sloped portion of the first magnetic layer and the second shield layer, the isolating layer isolating the pole portion and the sloped portion from the second shield layer, and defining the shapes of the pole portion and the sloped portion. In this case, the characteristics of the composite thin-film magnetic head are improved.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:

a medium facing surface that faces toward a recording medium;

a first magnetic layer including a pole portion and a second magnetic layer including a pole portion, the first and second magnetic layers being magnetically coupled to each other, the pole portions being opposed to each other and placed in regions of the magnetic layers on a side of the medium facing surface, each of the magnetic layers including at least one layer;

a gap layer provided between the pole portions of the first and second magnetic layers; and a thin-film coil at least a part of which is placed between the first and second magnetic layers, the at least part of the coil being insulated from the first and second magnetic layers; wherein:

the first magnetic layer includes: the pole portion touching the gap layer; a flat portion located at a distance from the gap layer in the direction of thickness of the gap layer, and located farther from the medium facing surface than the pole portion; and a sloped portion connecting the pole portion and the flat portion to each other, the distance from the sloped portion to the gap layer decreasing with decreases in the distance from the sloped portion to the medium facing surface;

the first magnetic layer defines a throat height;

the at least part of the thin-film coil is located on a side of the pole portion and the sloped portion of the first magnetic layer; and the second magnetic layer includes a flat layer that touches a flat surface including the gap layer and defines a track width.

2. The thin-film magnetic head according to claim 1 wherein the sloped portion has a curved surface that faces toward the gap layer.

3. The thin-film magnetic head according to claim 1, further comprising an insulating layer that covers the at least part of the coil located on the side of the pole portion and the sloped portion of the first magnetic layer, and has a surface facing toward the gap layer, the surface being flattened together with a surface of the pole portion of the first magnetic layer facing toward the gap layer.

4. The thin-film magnetic head according to claim 1, further comprising: a magnetoresistive element; and a first shield layer and a second shield layer for shielding the magnetoresistive element, the shield layers including portions located on a side of the medium facing surface and opposed to each other, the magnetoresistive element being placed between the shield layers.

5. The thin-film magnetic head according to claim 4 wherein:

the flat portion of the first magnetic layer is adjacent to the second shield layer; and an isolating layer is provided between the pole portion and the sloped portion of the first magnetic layer and the second shield layer, the isolating layer isolating the pole portion and the sloped portion from the second shield layer, and defining shapes of the pole portion and the sloped portion.

6. The thin-film magnetic head according to claim 5 wherein the isolating layer is made of a nonmagnetic material.

* * * * *